Oct. 14, 1924.  1,511,471
E. HOLMES ET AL
WHEEL BRACE FOR VEHICLES
Filed July 22, 1918
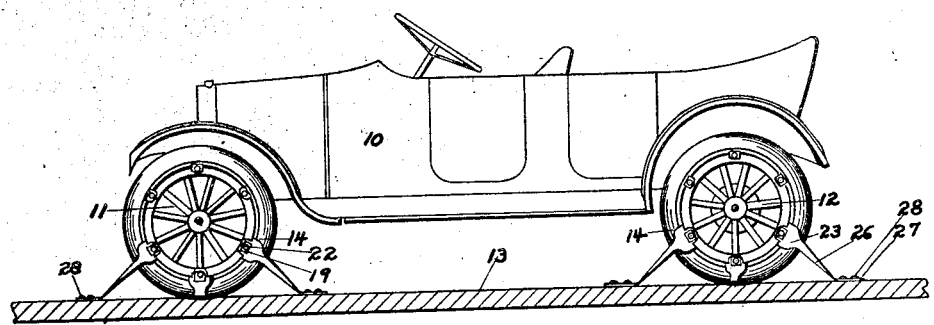
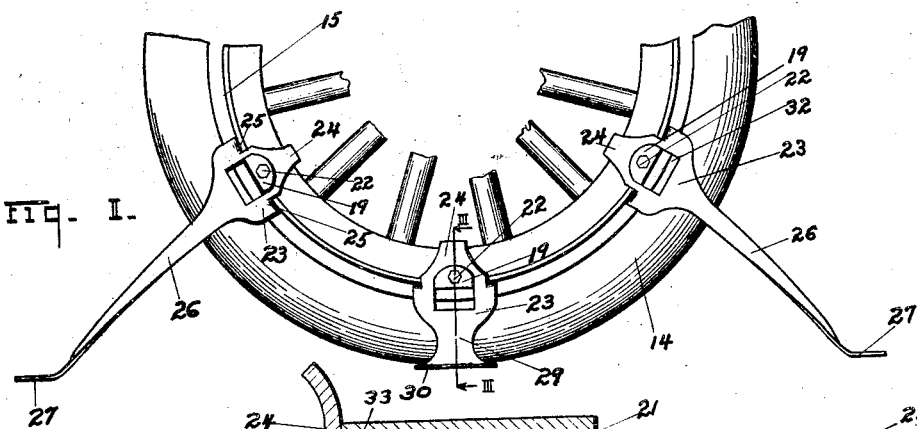
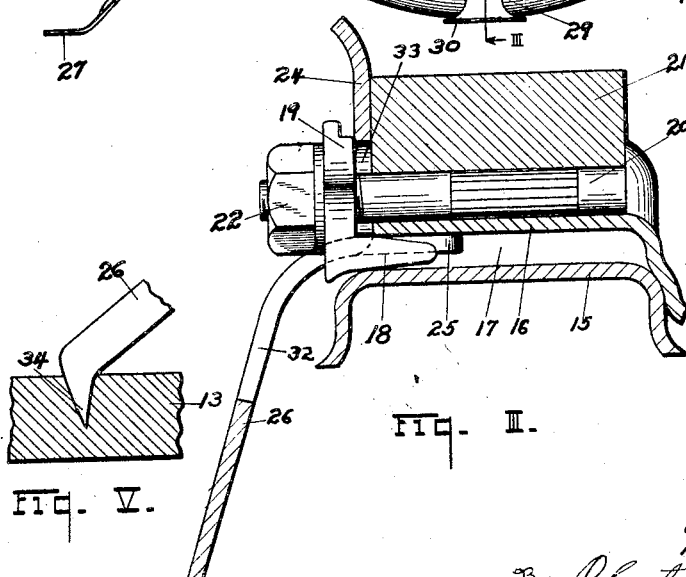
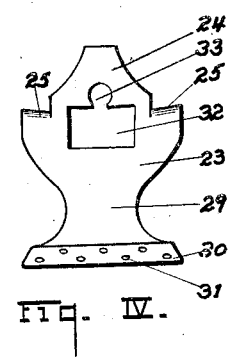
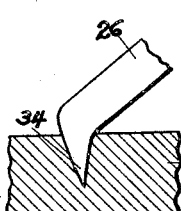
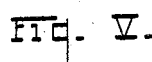
Inventors
Edward Holmes
Arthur D. Lightner
By Chester H. Braselton
Attorney Patented Oct. 14, 1924.

1,511,471

UNITED STATES PATENT OFFICE.

EDWARD HOLMES AND ARTHUR D. LIGHTNER, OF TOLEDO, OHIO, ASSIGNORS TO THE WILLYS-OVERLAND COMPANY, OF TOLEDO, OHIO, A CORPORATION OF OHIO.

WHEEL BRACE FOR VEHICLES.

Application filed July 22, 1918. Serial No. 246,215.

*To all whom it may concern:*

Be it known that we, EDWARD HOLMES and ARTHUR D. LIGHTNER, citizens of the United States, residing at Toledo, in the county of Lucas and State of Ohio, have invented certain new and useful Improvements in Wheel Braces for Vehicles, of which we declare the following to be a full, clear, and exact description.

Our invention relates to wheel braces for vehicles and has for its object to provide improved means for bracing and tying the wheels of an automobile or other vehicle during shipment to insure the arrival of the vehicle at its destination in proper condition.

A further object of the invention is to provide an improved brace or tie which is applicable to the rim and felly of a vehicle wheel and which may be temporarily applied thereto and held by the wedge bolts connecting the inner and outer wheel rim members.

A still further object of the invention is to provide a metal brace or tie for the wheels of an automobile which can be quickly and easily applied to and removed from the wheel by unskilled workmen and readily connected with the base or platform supporting the car during shipment.

Further objects, and objects relating to economies of manufacture and details of construction, will definitely appear from the detailed description to follow.

We accomplish the objects of our invention by the devices and means described in the following specification. Our invention is clearly defined and pointed out in the appended claims.

A structure constituting a preferred embodiment of our invention is illustrated in the accompanying drawings, forming a part of this specification, in which:

Figure I is a side elevation of an automobile showing the manner of bracing and tying the wheels thereof to the deck or floor upon which the car is mounted.

Figure II is a fragmentary side elevation of one of the vehicle wheels showing the application of the tie or brace thereto.

Figure III is an enlarged, detail, sectional view taken on line III—III of Figure II.

Figure IV is an enlarged, detail, side elevation of the wheel brace shown in Figure II, at the bottom thereof, and Figure V is a detail view showing a slightly modified form of brace.

In the transportation of automobiles from one point to another, by shipment in box or railway cars, it is desirable to provide means for tying and bracing the wheels of the vehicle so that the latter will be securely held against accidental displacement, either longitudinally or laterally of the floor or deck upon which the vehicle is mounted. It is also desirable that the means for bracing and tying the wheels to secure the vehicle upon its base or support be of such a nature as to permit of its ready easy application to and removal from the vehicle wheels by unskilled labor and at the same time be applicable without removing any of the parts of the wheels or disfiguring the same when applied thereto.

The present invention embodies devices having these characteristics, as will appear from the detailed description to follow.

Referring to the drawings, 10 represents an automobile having the front and rear wheels 11 and 12 respectively, which rest upon and are supported by the frame or floor 13, as shown in Figure I. The wheels shown in the drawings are preferably of the demountable rim type, and are provided with the usual pneumatic tires 14 secured upon the outer rims 15 which carry the inner rims 16 as shown in Figure III. Between said rims is the space 17 adapted to receive the wedges 18 having the vertically disposed felly-engaging portions 19 held by the bolts 20 extending through the felly 21 and provided on their outer ends with the nuts 22.

The wheel engaging portions of the several ties or braces shown in Figure II are the same and hence a description of one will suffice for both.

The braces or ties are preferably stamped from one piece of metal, such as relatively thin sheet steel or iron of a thickness to present, when pressed into proper form, bracing members for the wheels having some degree of resiliency, but at the same time being rigid enough to stand up under the strains imparted thereto by the thrust of the vehicle forwardly and backwardly from time to time during shipment. The ties and braces comprise the upper enlarged head portions indicated generally at 23 from which extend the reduced triangular members 24, on the opposite sides of which are formed upon the head, and preferably integral therewith, the laterally extending tongues or projections 25 disposed substantially at right angles to said triangular portions. Extending from the heads on the side opposite said triangular portions are the main body or strut portions 26 of the brace which are twisted through an angle of 90° near their outer extremities and bent to form the feet or floor engaging portions 27, the latter being connected with the floor or frame 13, in the preferred embodiment of the invention, preferably by means of the nails 28, as indicated in Figure I.

The wheel ties shown in Figure IV and at the bottom of the wheels in Figures I and II, are provided with the relatively short body portions 29 from which extend the angularly disposed feet or floor engaging portions 30 having the apertures 31 through which nails or other suitable securing members are driven into the floor to connect the tie therewith.

The heads 23 of the ties or braces are each provided with a relatively large rectangular cut or recess 32, at the upper edge of which is provided a relatively small communicating recess 33 which is preferably circular in shape and somewhat larger than the diameter of the bolt 20 which extends therethrough when the ties and braces are properly secured upon the wheels.

In the application of the ties or braces to the wheels, the nuts are partially unscrewed and the wedges moved outwardly upon the bolts. The brace is then inserted between the wedge and felly of the wheel with the prongs 25 projecting into the space 17 between the inner and outer rims of the wheel until the triangular portion 24 of the head engages the outer face of the felly 21, the wedge extending through the recess 33 of the head, as shown in Figure III and the nuts thereafter tightened up to clamp the vertical portion 19 of the wedge upon the felly engaging portion 24 of the head on opposite sides of the circular aperture 33, the latter being made considerably larger than the diameter of the bolt to prevent any possible interference of the brace with the threads of the bolt.

Nails or other suitable securing devices are then driven through the apertures in the feet of the brace and into the floor or frame 13, whereby the automobile is firmly tied and braced upon the floor.

In case one or more of the pneumatic wheel tires should become deflated, the entire weight on the wheel would, of course, fall upon the prongs 25 of the ties or braces and said prongs have, therefore, been designed to yieldingly resist the loads thrust upon them in cases of this kind and preferably are intended to be displaced a certain amount under such conditions, but the wheels will not assume the position they would take when the tires are deflated if the braces were not provided.

In the modification shown in Figure V, the foot of the brace has been changed to provide the pointed angularly disposed ends 34 which are adapted to be driven into the floor or frame, as shown, to avoid the use of nails or other securing members, as provided in the preferred embodiment of the invention.

We are aware that the particular embodiment of our invention which we have here shown and described, is susceptible of considerable variation without departing from the spirit thereof, and, therefore, we desire to claim the same broadly, as well as specifically, as indicated by the appended claims.

Having thus described our invention, what we claim as new and desire to secure by Letters Patent, is:—

1. A wheel tie or brace comprising an upstanding body portion adapted to be connected with a floor or frame and having a member adapted to engage the wheel felly and an angularly disposed portion arranged to be projected into engagement with the wheel rim.

2. A wheel tie or brace comprising an upstanding body portion adapted to be connected with a floor or frame provided with an angularly disposed portion arranged to be projected into engagement with the wheel rim.

3. A wheel tie or brace comprising an upstanding body portion adapted to be connected with a floor or frame and provided with two angularly disposed portions, one of which is adapted to engage the wheel felly and the other the wheel rim, and means for securing said brace upon said wheel.

4. A wheel tie or brace comprising an upstanding body portion adapted to be connected with a floor or frame and having spaced wheel engaging portions angularly disposed upon the body.

5. A wheel tie or brace comprising an upstanding body portion adapted to be connected with a floor or frame, spaced wheel engaging portions angularly disposed upon the body and an intermediate wheel engaging portion extending substantially at a right angle to said spaced wheel engaging portions.

6. A wheel tie or brace comprising a body portion adapted to be connected with a floor or frame, and an integral resilient wheel engaging portion thereon.

7. A wheel tie or brace comprising a body portion adapted to be connected with a floor or frame, a resilient wheel engaging portion upon said body extending at substantially a right angle thereto and a second wheel engaging portion upon the body angularly disposed with respect to said first mentioned wheel engaging portion.

8. A wheel tie or brace comprising a body portion adapted to be connected with a floor or frame, a plurality of resilient portions upon the body adapted to engage the wheel above the tire, and an angularly disposed wheel engaging portion adjacent said first mentioned portions.

9. A wheel tie or brace comprising a body portion adapted to be connected with a floor or frame, a head upon the body portion having a recess therein to permit of the insertion of the head between the wedge and felly of a wheel having a demountable rim, and an angularly disposed member on said head adapted to extend into engagement with said rim.

10. A wheel tie or brace comprising a body portion adapted to be connected with a floor or frame, a head upon the body having a recess therein to permit of the insertion of the head between the wedge and felly of a wheel having a demountable rim and spaced angularly disposed members upon said head adapted to extend into engagement with said rim.

11. A wheel tie or brace comprising a body portion adapted to be connected with a floor or frame, and a head upon the body having a recess therein capable of accommodating the rim holding wedge and the wedge bolt of a wheel having a demountable rim.

12. A wheel tie or brace comprising a body portion adapted to be connected with a floor or frame and a stamped head upon the body having angularly disposed members formed thereon and adapted to engage the felly of a wheel for bracing the wheel upon said frame.

13. A wheel tie for securing the wheels of a vehicle to a base or frame, said tie having a body provided with attaching portions adapted to be secured to the wheel felly and to said frame or base, said body having a tongue arranged to project laterally between two of the rim members.

14. A wheel tie for securing the wheels of a vehicle to a base or frame, said tie having a body provided with a central attaching portion adapted to be connected to the wheel rim and with tongues on opposite sides of said central portion arranged to extend into engagement with a portion of the rim, said body having an angularly disposed portion adapted for connection to said base or frame.

15. A metal wheel tie comprising a body portion having outturned stiffening ribs and a base portion adapted to be connected with a floor, said body portion being provided with two angularly disposed portions, one of which is adapted to engage the wheel felly and the other the wheel rim, and means for securing said brace to said wheel.

16. In mechanism for securing a vehicle to a floor, said vehicle having wheels with bolts thereon, a plurality of securing straps for each wheel, each strap secured to one of said bolts and extending downwardly to said floor and means for securing said straps to said floor.

17. In a device of the class described, a strap for holding a vehicle, said strap having an aperture in its upper portion for engaging a wheel rim bolt and having a twisted lower portion bent to form an attaching foot, substantially as shown and described.

18. In combination, a floor, a vehicle supported on said floor, said vehicle provided with wheels, bolts on said wheels, two securing straps for each of said wheels, one of said straps connected to one of said bolts and extending downwardly, forwardly and laterally and the other connected to another of said bolts and extending downwardly, rearwardly and laterally from said wheel, and means for securing the lower ends of said straps to said floor.

19. In combination, a floor, a vehicle supported on said floor and provided with a wheel, rim bolts on said wheel, a plurality of brace members secured to said bolts and said floor for preventing the rotation of said wheel, substantially as shown and described.

In testimony whereof, we affix our signatures.

EDWARD HOLMES.
ARTHUR D. LIGHTNER.